Feb. 18, 1964 W. B. DUFFY ETAL 3,121,273
QUARTER-TURN FASTENER AND ASSEMBLY
Filed May 15, 1961 2 Sheets-Sheet 1

INVENTORS
WILLIAM B. DUFFY
RICHARD A. HARTMAN
BY
Charles F. Chisholm
Attorney

Feb. 18, 1964 W. B. DUFFY ETAL 3,121,273
QUARTER-TURN FASTENER AND ASSEMBLY
Filed May 15, 1961 2 Sheets-Sheet 2

INVENTORS
WILLIAM B. DUFFY
BY RICHARD A. HARTMAN

Charles F. Chisholm
Attorney

United States Patent Office

3,121,273
Patented Feb. 18, 1964

3,121,273
QUARTER-TURN FASTENER AND ASSEMBLY
William B. Duffy, Berkley Heights, and Richard A. Hartman, Madison, N.J., assignors to United-Carr Fastener Corporation, Boston, Mass., a corporation of Delaware
Filed May 15, 1961, Ser. No. 110,260
13 Claims. (Cl. 24—221)

This invention relates to rotary fasteners which are inserted through an opening in a member and then secured by turning the fastener through an angle of 90°, more or less. Such fasteners are sometimes referred to as quarter-turn fasteners since, in most instances, it is preferable to turn the fastener approximately 90°. For convenience we will designate the present fastener as a quarter-turn fastener without regard to whether, in particular instances, the fastener be turned considerably more or considerably less than 90°.

Many quarter-turn fasteners are known and are used for many specific purposes. The fastener may have an ornament or other element attached to it and serve to attach the ornament or element to a panel or other support. Perhaps more commonly, the fastener passes through a plurality of members or layers and serves to secure the same together.

Among the different objects of the invention are to provide a quarter-turn fastener which can be facilely inserted and secured, to provide a quarter-turn fastener which can be conveniently turned either with the fingers or with a hand tool, to provide a quarter-turn fastener which can be turned in contact with painted and soft surfaces with little or no marring of the surfaces, to provide a quarter-turn fastener which may be readily held captive in an improved manner to one or more of a plurality of members or layers that are to be secured by the fastener, to provide a quarter-turn fastener which has relatively large tolerance as regards the combined thickness of the layers that are to be fastened, to provide a quarter-turn fastener which can have great stability in all directions after being inserted and secured, to provide a quarter-turn fastener which has a low silhouette on one or both of the surfaces of the assembly of layers that is fastened by the fastener, and to provide an improved quarter-turn fastener which lends itself to rapid inexpensive manufacture on a quantity-production basis.

Other objects of the invention are to provide a quarter-turn fastener-assembly in which the fastener is captive in an improved manner to one or more of a plurality of members or layers secured by the fastener, to provide a quarter-turn fastener-assembly in which the fastener turns against and behind assembled layers without marring the same, to provide an improved quarter-turn fastener-assembly in which accurate registration of the holes in the various members or layers of the assembly is unnecessary as regards the fastening of the layers but may be provided for other reasons, and to provide a quarter-turn fastener-assembly in which sliding movement between the secured members or layers may be limited as closely as desired.

Further objects and advantages of the invention will be apparent from the disclosure hereof including the drawings. While we are setting forth the best modes thus far contemplated by us of carrying out our invention, the disclosure hereof is by way of illustration and example since the invention has various applications and lends itself to embodiments other than the embodiments disclosed herein.

In the claims, as well as in the description, parts may at times be identified by specific names for ease of reference and ready understanding, but such nomenclature is to be understood as having the broadest meaning consistent with the context and with the concept of our invention as distinguished from the pertinent prior art. Where parts are, for clarity and convenience, referred to on the basis of their oriented position shown in the drawing or in any other oriented position, no limitation as to the positioning of the entire structure is to be inferred, since the entire structure may be placed in any oriented position.

In the drawings, which form a part of this specification,

FIG. 9 is an elevation of a fastener-receiving fitting that may be applied to a soft member or layer that is to be fastened.

FIG. 10 is a section of the fitting of FIG. 9, taken on the line 10—10 of FIG. 9.

FIG. 11 is a section of two relatively soft members or layers fastened with the fastener of FIG. 1, one of the layers being provided with the fastener-receiving fitting of FIG. 9. The plane of the section is indicated by the line 11—11 in FIG. 9, the fastener itself being shown in elevation.

FIG. 12 is a top plan view of a second form of fastener nose, looking as from the top of FIG. 1.

FIG. 13 is a side elevation of the fastener nose of FIG. 12, looking from the bottom of FIG. 12.

FIG. 14 is a view of the fastener nose of FIG. 12, looking from the left of FIG. 12.

FIG. 15 is a top plan view of a third form of fastener nose, looking as from the top of FIG. 1.

FIG. 16 is a side elevation of the fastener nose of FIG. 15, looking from the bottom of FIG. 15.

FIG. 17 is a view of the fastener nose of FIG. 15, looking from the left of FIG. 15.

In FIGS. 12–17 a very short length of the 2-layer fastener shank is shown extending from the fastener nose and, to avoid confusion, the curved members which extend from the shank (see FIG. 7) are ignored.

Figure 1:
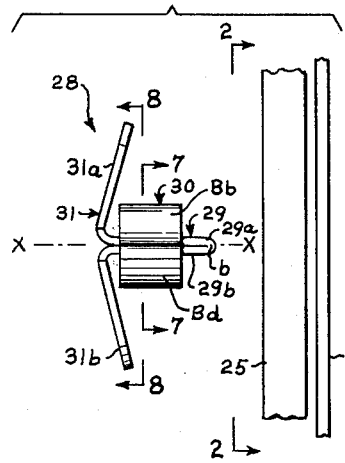
FIG. 1 is an exploded view showing the fastener in side elevation, with its axis horizontal, and showing in side elevation the edges of two vertically-positioned members or layers that are to receive the fastener.

FIG. 18 is a front elevation of a second form of fastener head, looking as from the left of FIG. 1.

FIG. 19 is a section of the fastener head of FIG. 18, taken on the line 19—19 of FIG. 18.

FIG. 19A is a section on the line 19A—19A of FIG. 18.

FIG. 20 is a front elevation of a third form of fastener head, looking as from the left of FIG. 1.

FIG. 21 is a side elevation of the fastener head of FIG. 20, looking from the left of FIG. 20.

Figure 2:
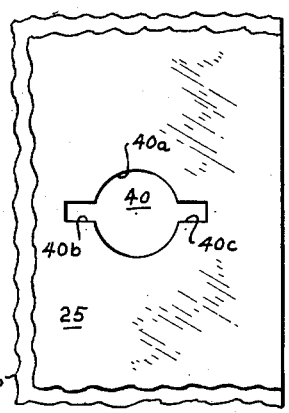
FIG. 2 is a front elevation of the two members or layers shown in FIG. 1, viewed from the line 2—2 in FIG. 1.
Figure 3:
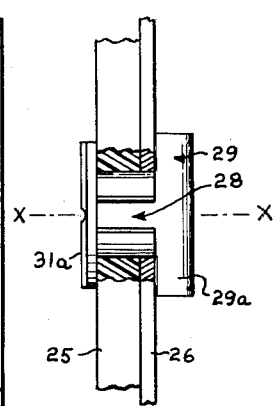
FIG. 3 is a side elevation showing the two members or layers of FIGS. 1 and 2 fastened by the fastener, such members being partially in section to show in side elevation that portion of the applied fastener which extends through the two members or layers.

In FIGS. 1, 2 and 3 elements 25 and 26 represent members or layers that are to be fastened together by the fastener 28. The elements 25 and 26 may be any layerlike members, or layerlike portions of members, which are to receive the fastener 28. For example, the member 25 may be a sheet of hard board, e.g., that sold under the brand name of Masonite, which is to be fastened to the back of a television set as a cover. The member 26 would then represent a member of the television-set case, or a layerlike portion thereof, to which the cover was to be fastened.

The fastener 28 has an axis X—X on which it is rotated a quarter turn in securing it. We form the fastener from a strip of sheet metal, folded at its transverse center line into a bight at $b$. Proceeding from the bight the fastener has a nose 29, a body 30 and a head 31.

Figure 4:
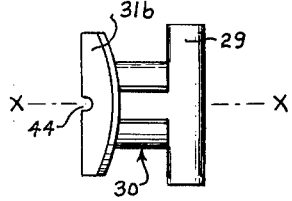
FIG. 4 is a top plan view of the fastener of FIG. 1, looking from the top of FIG. 1.
Figure 5:
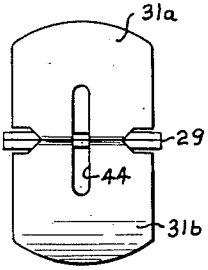
FIG. 5 is a front elevation of the fastener of FIG. 1, looking from the left of FIG. 1.
Figure 6:
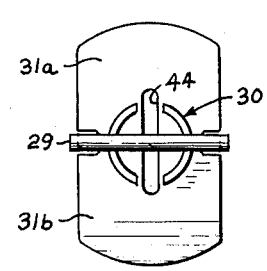
FIG. 6 is a rear elevation of the fastener of FIG. 1, looking from the right of the fastener in FIG. 1.

As is seen in FIG. 1 the nose 29 is composed of two sheet-metal layers 29a and 29b, which are substantially in face-to-face contact. As is seen in FIGS. 3 and 4 the nose is barlike and extends transversely of the fastener axis X—X.

Figure 7:
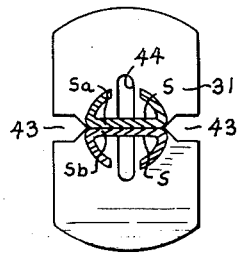
FIG. 7 is a vertical section of the fastener of FIG. 1, taken on the line 7—7 of FIG. 1.

As is perhaps best seen in FIG. 7, the body 30 of the fastener is composed of a shank S that is embraced by a barrellike formation B that we call the barrel. The shank S is composed of two sheet-metal layers Sa and Sb which extend homogeneously from the nose layers 29a and 29b. The barrel B is formed by curved ears Ba, Bb, Bc and Bd that extend homogeneously from the edges of the shank layers.

The head 31 is composed of two sheet-metal portions which extend homogeneously from the shank layers Sa and Sb and which are bent outwardly to provide wings 31a and 31b. These wings form a dihedral angle, half of the angle lying on one side of the axis X—X and half of the angle lying on the other side of the axis X—X. Each half of the angle is somewhat less than 90° as measured from the bight $b$.

Figure 2A:
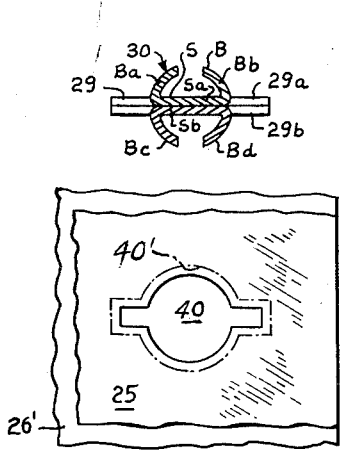
FIG. 2A is a view similar to FIG. 2, showing a modification.

The layerlike member 25 has a fastener-receiving opening designated as a whole by 40. This opening has a central circular-portion 40a from which slots 40b and 40c extend diametrically. The layerlike member 26 (FIG. 2) may have an identical opening which registers with the opening 40 in member 25. In the alternative, and for a reason which will be explained, the layerlike member 26 may be replaced by the layerlike member 26′ which is shown in FIG. 2A. The member 26′ is identical with the member 26 except that it has the opening 40′ which is shown in dotted lines in FIG. 2A. The opening 40′ is similar to the opening 40 but is somewhat larger. The opening 40 in layerlike member 25 and the opening 40′ in layerlike member 26′ are related to each other as shown in FIG. 2A.

In applying the fastener 28 to the members 25 and 26 the nose 29 of the fastener is passed through the slots 40b and 40c. Before the nose of the fastener has passed through member 26 the tips of the wings 31a and 31b engage the face of member 25. Under pressure applied to the head 31 of the fastener the wings 31a and 31b yield resiliently, thereby allowing the nose 29 to pass completely through the member 26. Then the fastener is rotated 90°, bringing it to the position shown in FIG. 3 in which the outwardly extending portions of the nose 29 engage behind the member 26. The wings 31a and 31b are engaged against the member 25 and, upon release of the pressure that was applied to the head 31 to complete the insertion of the fastener, the fastener resiliently clamps the members 25 and 26.

The fastener-head 31 is wider than shank S and is notched at 43, 43 (FIG. 8) to merge with shank layers Sa and Sb. To receive a screw driver for applying pressure to the fastener head and turning the fastener, the head 31 is provided with a screw-driver slot 44. As shown, half of the slot 44 lies in wing 31a and half in wing 31b.

We make the central circular-portion 40a of the opening 40 in member 25 of such size as to receive the barrel B of the fastener in sliding-fit relationship, with several thousandths-of-an-inch allowance. As the fastener is inserted it is protected against troublesome canting in any direction due to the relatively large diameters of the barrel B and the co-operating circular portion 40a of the opening in member 25. This makes for facile insertion of the fastener without catching or hanging of the fastener while it is being inserted and turned. Once the assembly has been completed, the relatively large diameter of the barrel of the fastener and its engagement with the margin of the circular portion 40a of the opening 40 afford stability of the fastener in all directions.

In some instances we provide member 26 with an opening 40 identical to and registering with the opening 40 in member 25. The thickness of member 26 is thereby added to that of member 25 as regards preventing canting of the fastener while it is being inserted and also as regards stability of the fastener in all directions in the completed assembly. In FIGS. 2 and 3, the close engagement of the barrel of the fastener with the circular portions 40a of the openings 40 in members 25 and 26 prevents sliding movement in any direction between such two members 25 and 26 in the completed assembly.

In some assemblies prevention of sliding movement between the layerlike members is of no moment. In those instances we use the arrangement of FIG. 2A in which the member 26′ has the enlarged opening 40′ that appears in dotted lines. The enlarged opening 40′ provides for insertion of the fastener despite a measure of misalignment between the openings in members 25 and 26′. An adequate assembly is still obtained, since the fastener nose 29 is long enough transversely of the fastener axis to span the circular-portion of the enlarged opening 40′.

In the assembly of FIG. 3 the member or layer 25 which is adjacent to the head of the fastener is relatively thick. In some assemblies, however, the head-adjacent layer of the assembly is quite thin, as when such layer is a sheet-metal cover for a sheet-metal box. For such use we provide the fastener with the modified barrel B′ shown in FIG. 8A. The head-adjacent edges of the four curved ears constituting the barrel are nested closely against the fastener wings 31a and 31b and are so inclined to the fastener axis that, in the unapplied fastener, such edges of the curved ears lie more or less parallel to the wings 31a and 31b. In FIG. 8A two of the curved ears appear, and they are designated Bb′ and Bd′ since they correspond to the ears Bb and Bd in FIG. 7.

The fastener of the present invention is useful for assembling boxes, toys, doll houses, displays and other structures that are shipped in knock-down form and assembled where they are to be used. Structures of this type are often made of paperboard, including corrugated paperboard. Sometimes such structures are made from laminated sheet materal sold under the brand name of Fome-Cor. This has a layer of puffed styrene-type plastic, to each surface of which is bonded a layer of material similar to very heavy kraft paper.

When using the fastener for assembling layers of material such as referred to in the foregoing paragraph we provide the layer which receives the nose of the fastener with a sheet-metal fitting that receives the clamping force of the nose of the fastener and transmits it to the material of the layer.

A fitting which we use is shown in FIGS. 9 and 10, being made from a triangular piece of sheet metal which is formed into a generally flat stamping 50. This stamping has a planar body 51 and a depressed center portion 52. The center portion 52 is provided with an opening 40 which is the same as the opening 40 in FIG. 2. At about 90° from the slots 40b and 40c of the opening we emboss ridges $R_1$, $R_2$, $R_3$ and $R_4$ which extend chordally of the circular depression 52 and which are disposed as shown in FIG. 9. The corners of the triangular piece of sheet metal are all bent in the same direction to form triangular tabs 54 (one shown) which, in the unapplied fitting, extend perpendicularly to the planar body 51.

Referring to FIG. 11 the layer 60, which is of the Fome-Cor previously mentioned, has a circular hole 61 which is just large enough to permit the depressed portion 52 of the fitting 50 to be conveniently nested within it. In applying the fitting to the layer 60 the triangular tabs 54 are pushed through the layer and clinched on the opposite side. The layer 64, which is also of Fome-Cor, is provided with a hole 65 which is large enough to permit the nose 29 of the fastener to pass through it, at least by placing the nose 29 at an angle and threading one end of the nose through first.

The assembly of FIG. 11 is made in the manner referred to in connection with FIGS. 1–3. The nose 29 of the fastener is passed through the layer 64 and thence through the fitting 50 or layer 60. Then the fastener is rotated a quarter turn. As the fastener approaches the quarter-turn position the end portions of the barlike nose 29 ride over embossed ridges $R_1$ and $R_4$ (or $R_2$ and $R_3$) and lodge between the adjacent ridges, thereby preventing fortuitous movement of the fastener from the quarter-turn position. The fitting 50 receives the pressure applied by the nose 29 of the fastener, and transmits the clamping pressure to layer 60. The head 31 of the fastener has sufficient area to directly press against and clamp layer 64.

Where the nose-adjacent layer of the assembly is made of metal, as in FIGS. 1–3, we emboss ridges such as $R_1$, $R_2$, $R_3$ and $R_4$ directly on the metal member itself so that the nose 29 of the fastener will ride over and lodge between the ridges thereby preventing fortuitous rotation of the fastener from the quarter-turn position.

FIGS. 12, 13 and 14 show a fastener nose 29' which we use in some instances in lieu of the fastener nose 29 shown in FIGS. 1, 3, 4, 6, 7 and 8A. The two layers 29a' and 29b' of this fastener nose are flared apart at f, the flaring extending a short distance from each end of the nose toward the axis of the fastener and also extending for a portion of the distance from the bight-removed edge of the nose to the bight b.

For a fastener having this form of nose we use, in the head-adjacent layer of the assembly, somewhat narrower slots 40b and 40c (FIG. 2). The width of these slots is then slightly less than the over-all thickness of the nose 29' at the largest part of the flare. When the fastener nose is forced through such narrower slots the flared portions of the nose are flexed toward one another, and then spring back as the nose 29' passes completely through the layer. Thus the fastener becomes captive to the head-adjacent layer of the assembly. This is often desirable, e.g., where the head-adjacent layer of the assembly is a cover that is to be removed and replaced from time to time. In the layer or layers of the assembly other than the head-adjacent layer we use slots 40b and 40c which are wide enough to pass the nose 29' without interference. With this arrangement an applied cover can be removed leaving the fasteners captive to the cover and ready for reapplication of the cover.

In the form of nose shown in FIGS. 12, 13 and 14 we reduce the width of the nose at 70 by curvatures at 71, 71. This reduces the cross-sectional area of the layers 29a' and 29b' that have to bend in passing the nose through slots 40b and 40c of restricted width, thereby making it easier to insert the fastener through the head-adjacent layer and bring it into position where it is captive to that layer of the assembly.

FIGS. 15, 16 and 17 show another fastener nose which we use to hold the fastener captive to a cover or other head-adjacent layer of the assembly. In these figures the fastener nose 29" has the two layers 29a" and 29b" which are provided adjacent their ends with spring fingers 72 and 73, respectively. These spring fingers are formed by slitting the layers 29a" and 29b" at 74 and 75, respectively, and then bending the resultant finger outwardly. We dispose the slits parallel to the fastener axis and extend each slit from the bight-removed edge of the nose 29" to the very tip of the fastened. We also make the nose 29" without the slits at 74 and 75. In that case we flare both end portions of layer 29a" and of layer 29b", producing formations similar to the flares at f in FIGS. 13 and 14 but with the flares extending to the juncture of layers 29a" and 29b".

As with the nose 29' of FIGS. 12 and 13, we use the nose 29" of FIGS. 15–17 with slots 40b and 40c (FIG. 2) which, in the head-adjacent layer of the assembly, are of a width allowing the nose to be inserted through the slots and then spring out and lock behind the head-adjacent layer of the assembly. In the other layers of the assembly we make the slots 40b and 40c wide enough to pass the nose without interference.

FIGS. 18, 19 and 19A show a fastener head 31' which we may use in lieu of the fastener head 31 shown in FIGS. 1, 3–6 and 8–8A. In the head 31' the metal extending from the shank layers Sa and Sb (see also FIG. 8) is continued in the direction of the fastener axis and is then recurved toward the nose of the fastener before being extended outwardly into wings 31a' and 31b'. This provides the fastener head with a protuberance, designated as a whole by 76. This protuberance can be grasped with the fingers, or with pliers, for inserting the fastener and then giving it a quarter-turn. In the upper portion of the protuberance 76 we provide a slot 77 to receive a screw driver for use in inserting the fastener and giving it a quarter-turn.

The tips of wings 31a' and 31b' are rounded as the head is viewed in elevation in FIG. 18. Additionally, these tips are curved in cross section as the head is viewed in FIG. 19, providing smooth rounded bearing surfaces at 78 and 79, respectively, whereby the fastener head glides smoothly over a painted surface on the head-adjacent layer of the assembly without marring the paint. In the fasteners of FIGS. 1, 3–6 and 8–8A we also contemplate forming the tips of the wings (31a and 31b) in like manner so as to provide the smooth bearing surfaces 78 and 79 that are shown in FIG. 19.

Figure 8:
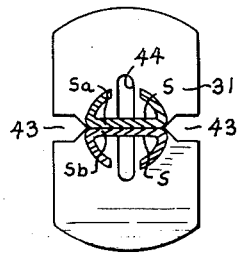
FIG. 8 is a vertical section of the fastener of FIG. 1, taken on the line 8—8 of FIG. 1.
Figure 8A:
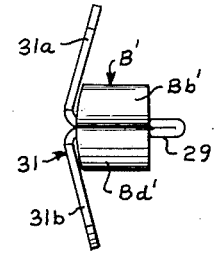
FIG. 8A is a side elevation of a fastener like the fastener shown in FIG. 1 but having a modified barrel.

The head 31' of FIGS. 18, 19 and 19A substitutes for the head 31 in the fasteners of FIGS. 1, 3–6 and 8–8A and, as perhaps best seen in FIG. 8, the head is considerably wider than the shank S which is composed of shank layers Sa and Sb. As seen in FIG. 19A we use radii such as 80, 80 to connect the edges of the head 31' with the edges of the narrower shank layers, the shank layer Sa being shown in FIG. 19A.

FIGS. 20 and 21 show another fastener head which we may use in lieu of the fastener head 31 shown in FIGS. 1, 3–6 and 8–8A. The fastener head 31" of FIGS. 20 and 21 is the same as the fastener head 31 except that the outwardly extending wings 31a" and 31b" thereof are somewhat shorter than the wings 31a and 31b and a their free ends are provided with tabs 84 and 85, respectively. Each such tab extends approximately perpendicularly to its wing as is best seen in FIG. 21.

The two tabs 84 and 85 taken together constitute means which may be grasped with the fingers or with pliers for inserting the fastener and giving it a quarter-turn. When the tabs 84 and 85 are drawn toward one another with the fingers or with pliers, the wings 31a" and 31b" are flexed into positions more nearly perpendicular to the axis of the fastener thereby reducing the axial pressure that must be applied to the fastener to insert it.

In making a particular fastener we select any one of the three specific fastener noses disclosed, viz., nose 29 (FIGS. 1, 3–7 and 8A), nose 29' (FIGS. 12–14) and nose 29" (FIGS. 15–17). With the selected nose we use any one of the three fastener heads disclosed, viz., head 31 (FIGS. 1, 3–6 and 8–8A), head 31' (FIGS. 18–19A) and head 31" (FIGS. 20–21). At present we prefer to make the fastener with head 31' (FIGS. 18–19A) and nose 29" (FIGS. 15–17); and at present we prefer to make the nose 29″ without the slits 74 and 75 and with flared ends as hereinbefore referred to.

In using the heads 31′ and 31″ we place the barrel of the fastener close to the head, for the reasons explained in connection with FIG. 8A. To this end we contemplate using the barrel B′ of FIG. 8A, in which the head-adjacent edges of the barrel are more or less parallel to the wings of the unapplied fastener. Using the head 31′ of FIGS. 18–19A the barrel may be nested within the loops of protuberance 76, whereby passage of the barrel through a thin head-adjacent layer of an assembly is obviated even though the head-adjacent edges of the barrel extend perpendicularly to the fastener axis as in FIG. 1.

We form our fasteners of unhardened spring steel and harden and temper them after forming. In addition to so forming the head that it will glide smoothly over the head-adjacent layer of the assembly we round off the edges and the corners of the nose that lies contiguous to the nose-adjacent layer of the assembly, thereby providing for smooth slide movement between that layer of the assembly and the nose.

The fasteners herein disclosed have a low silhouette on the inner surface of the assembled layers, particularly so in the assembly of FIG. 11. This reduces the likelihood of interference with or damages to adjacent parts or materials, e.g., electrical wiring. It also provides greater clearance for solid objects within an assembled structure. A low silhouette is also desirable at times on the outer surface of the assembled layers, e.g., to obviate the likelihood of snagging clothing or one's hands. In such cases the head 31 of FIGS. 1, 3–6 and 8–8A may be used to advantage.

For fasteners having a barrel whose outside diameter is .230″ we have used the dimensions given hereinafter. When making the fasteners with either head 31 or head 31″ we have used stock .021″ thick. When making fasteners with head 31′ we have used stock .017″ thick. With heads 31 and 31″ we have, in the unapplied fastener, placed the wings (31a, 31b and 31a″, 31b″) at an angle of approximately 79° to the fastener axis X—Y. With head 31′ we have, in the unapplied fastener, placed the wings (31a′, 31b′) at an angle approximately 77° to the fastener axis X—X. With all three forms of heads we have given the head a width of .375″. In the unapplied fastener we have given the head an over-all dimension on the long axis of the head .687″ for head 31, .725″ for head 31′ and .700″ for head 31″.

Using any of the three heads we have made the shank S .200″ wide. Using any of the three heads we have made the fasteners with noses .100″ high measured in the direction of the fastener axis X—X and .415″ long measured perpendicularly to the fastener axis X—X, whether the nose be nose 29, nose 29′ or nose 29″. In nose 29″ we have made the maximum thickness of the nose (at the tips of the free ends of fingers 72 and 73) .065″ when the fastener was made with stock .017″ thick and .070″ when the fastener was made with stock .021″ thick.

In the opening 40 (FIG. 2) we have given the circular portion 40a a diameter of .250″ and have placed the outer ends of slots 40b and 40c .438″ apart, and we have given slots 40b and 40c a width of .053″ where a nose 29″ made from .017″ stock was to latch behind the layer, and a width of .058″ where a nose 29″ made from .021″ stock was to latch behind the layer.

For opening 40′ (FIG. 2A) we have used a diameter of .281″ for the circular portion of the opening, a width of .094″ for the two slots and a dimension of .500″ from the outer end of one slot to the outer end of the other slot.

In inserting the fastener the wings of the head yield sufficiently to accommodate the fastener to considerable variation in the combined thickness of the layers of the assembly; and our fasteners have successfully coped with a variation of .025″ and more. However, the axial length which we use for the fastener shank and barrel depends upon the median assembly thicknesses for which the fastener is designed. For a median assembly thickness of .085″ we have given the barrel an axial length of .075″.

All of the foregoing dimensions are nominal, subject to actual production to variations within tolerances suitable to the particular dimensions.

We claim:
1. An assembly comprising:
first and second layerlike members in face-to-face relation, with aligned through-openings providing for the insertion of a fastener-nose through the first member and thence through the second member,
    the through-opening in said first member having a circular portion and two slots that extend diametrically in opposite directions from the circular portion, and the width of each slot being a minor fraction of the diameter of the circular portion,
a completely preformed barlike fastener-nose,
    the barlike fastener-nose being disposed at right angles to the length of the slots in said first member and the end portions of the barlike formation being in engagement with the exposed face of said second member.
    the fastener-nose being composed of sheet metal folded to provide two face-to-face layers of sheet metal connected by a bight at the tip of the fastener-nose,
    the fastener-nose projecting only a short distance from the exposed face of said second member whereby the nose has a low silhouette on said second member,
    the fastener-nose having a length and width adapting it, when appropriately oriented, to be inserted through the through-openings in both of said members and be withdrawn through the through-opening in said second member,
    the layers of the fastener-nose having springy portions which, when the fastener-nose is inserted, are deflected upon passage of such portions through the slot-portions of the through-opening in said first member and which then return to their undeflected condition and oppose withdrawal of the fastener-nose through the opening in said first member,
a completely preformed fastener-shank composed of two layers of sheet metal which are homogeneous with the respective layers of the fastener-nose,
    the fastener-shank having a body disposed in the through-openings of said second and first members,
        the shank-body being of lesser width than the diameter of the circular portion of the through-opening in said first member,
a completely preformed fastener-barrel which embraces the body of the fastener-shank and the outer surface of which confronts the margin of the circular portion of the through-opening in said first member,
    said barrel being composed of curved sheet-metal portions extending homogeneously from the edges of the shank-body,
and a completely preformed fastener-head comprising springy sheet-metal wings engaging the exposed face of said first member and extending in opposite directions from the fastener-shank,
    the wings being homogeneously connected to the respective shank-layers at flat portions of the shank-layers,
    the wings when unstressed being inclined toward the fastener-nose as each wing is traversed in the direction away from the fastener-shank,
    and the wings being flexed in the direction away from the fastener-nose and, in co-operation with the fastener nose, resiliently urging said first and second members toward each other.
2. An assembly comprising:

first and second layerlike members in face-to-face relation, with aligned through-openings providing for the insertion of a fastener-nose through the first member and thence through the second member, the through-opening in said first member having a circular portion and two slots that extend diametrically in opposite directions from the circular portion, and the width of each slot being a minor fraction of the diameter of the circular portion, a completely preformed barlike fastener-nose, the barlike fastener-nose being disposed at right angles to the length of the slots in said first member and the end portions of the barlike formation being in engagement with the exposed face of said second member, the fastener-nose being composed of sheet metal folded to provide two face-to-face layers of sheet metal connected by a bight at the tip of the fastener-nose, the fastener-nose projecting only a short distance from the exposed face of said second member whereby the nose has a low silhouette on said second member, the fastener-nose having a length and width adapting it, when appropriately oriented, to be inserted through the through-openings in both of said members and be withdrawn through the through-opening in said second member, the layers of the fastener-nose having springy portions which, when the fastener-nose is inserted, are deflected upon passage of such portions through the slot-portions of the through-opening in said first member and which then return to their undeflected condition and oppose withdrawal of the fastener-nose through the opening in said first member, a completely preformed fastener-shank composed of two layers of sheet metal which are homogeneous with the respective layers of the fastener-nose, the fastener-shank having a body disposed in the through-openings of said second and first members, the shank-body being of lesser width than the diameter of the circular portion of the through-opening in said first member, a completely preformed fastener-barrel which embraces the body of the fastener-shank and the outer surface of which confronts the margin of the circular portion of the through-opening in said first member, said barrel being composed of curved sheet-metal portions extending homogeneously from the edges of the shank-body, and a completely preformed fastener-head comprising springy sheet-metal winds engaging the exposed face of said first member and extending in opposite directions from the fastener-shank, the fastener-head projecting only a short distance from the exposed face of said first member whereby the head has a low silhouette on said first member, the wings being homogeneously connected to the respective shank-layers at flat portions of the shank-layers, the wings when unstressed being inclined toward the fastener-nose as each wing is traversed in the direction away from the fastener-shank, and the wings being flexed in the direction away from the fastener-nose and, in co-operation with the fastener-nose, resiliently urging said first and second members toward each other.

3. An assembly comprising:

first and second layerlike members in face-to-face relation, with aligned through-openings providing for the insertion of a fastener-nose through the first member and thence through the second member, the through-opening in said first member having a circular portion and two slots that extend diametrically in opposite directions from the circular portion, and the width of each slot being a minor fraction of the diameter of the circular portion, a completely preformed barlike fastener-nose, the bar like fastener-nose being disposed at right angles to the length of the slots in said first member and the end portions of the barlike formation being in engagement with the exposed face of said second member, the fastener-nose being composed of sheet metal folded to provide two face-to-face layers of sheet metal connected by a bight at the tip of the fastener-nose, the fastener-nose projecting only a short distance from the exposed face of said second member whereby the nose has a low silhouette on said second member, the fastener-nose having a length and width adapting it, when appropriately oriented, to be inserted through the through-openings in both of said members and be withdrawn through the through-opening in said second member, the layers of the fastener-nose having springy portions which, when the fastener-nose is inserted, are deflected upon passage of such portions through the slot-portions of the through-opening in said first member and which then return to their undeflected condition and oppose withdrawal of the fastener-nose through the opening in said first member.

a completely preformed fastener-shank composed of two layers of sheet metal which are homogeneous with the respective layers of the fastener-nose, the fastener-shank having a body disposed in the through-openings of said second and first members, the shank-body being of lesser width than the diameter of the circular portion of the through-opening in said first member, a completely preformed fastener-barrel which embraces the body of the fastener-shank and the outer surface of which confronts the margin of the circular portion of the through-opening in said first member, said barrel being composed of curved sheet-metal portions extending homogeneously from the edges of the shank-body, and a completely preformed fastener-head comprising springy sheet-metal wings engaging the exposed face of said first member and extending in opposite directions from the fastener shank, the wings being homogeneously connected to the respective shank-layers at flat portions of the shank-layers, the connection of the wings to the shank-layers being by sheet metal extending away from the exposed face of said first member and then recurved toward the exposed face of said first member and finally joined homogeneously with said shank-layers, whereby the fastener-head is provided with a protuberance that is suitable for grasping to manipulate the fastener, the wings when unstressed being inclined toward the fastener-nose as each wing is traversed in the direction away from the fastener-shank, and the wings being flexed in the direction away from the fastener-nose and, in co-operation with the fastener-nose, resiliently urging said first and second members toward each other.

4. An assembly comprising:

first and second layerlike members in face-to-face relation, with aligned through-openings providing for the insertion of a fastener-nose through the first member and thence through the second member,
> the through-opening in said first member having a circular portion and two slots that extend diametrically in opposite directions from the circular portion, and the width of each slot being a minor fraction of the diameter of the circular portion, a completely preformed barlike fastener-nose,
> the barlike fastener-nose being disposed at right angles to the length of the slots in said first member and the end portions of the barlike formation being in engagement with the exposed face of said second member,
> the fastener-nose being composed of sheet metal folded to provide two face-to-face layers of sheet metal connected by a bight at the tip of the fastener-nose,
> the fastener-nose projecting only a short distance from the exposed face of said second member whereby the nose has a low silhouette on said second member,
> the fastener-nose having a length and width adapting it, when appropriately oriented, to be inserted through the through-openings in both of said members and be withdrawn through the through-opening in said second member,
> the layers of the fastener-nose having springy portions which, when the fastener-nose is inserted, are deflected upon passage of such portions through the slot-portions of the through-opening in said first member and which then return to their undeflected condition and oppose withdrawal of the fastener-nose through the opening in said first member, a completely performed fastener-shank composed of two layers of sheet metal which are homogeneous with the respective layers of the fastener-nose,
> the fastener-shank having a body disposed in the through-openings of said second and first members,
>> the shank-body being of lesser width than the diameter of the circular portion of the through-opening in said first member, a completely preformed fastener-barrel which embraces the body of the fastener-shank and the outer surface of which confronts the margin of the circular portion of the through-opening in said first member,
> said barrel being composed of curved sheet-metal portions extending homogeneously from the edges of the shank-body, and a completely preformed fastener-head comprising springy sheet-metal wings engaging the exposed face of said first member and extending in opposite directions from the fastener-shank,
> the wings being homogeneously connected to the respective shank-layers at flat portions of the shank-layers,
> the wings when unstressed being inclined toward the fastener-nose as each wing is traversed in the direction away from the fastener-shank,
> the wings being flexed in the direction away from the fastener-nose and, in co-operation with the fastener-nose, resiliently urging said first and second members toward each other,
> and the fastener-head including finger tabs at the ends of the wings for manually flexing the wings to reduce their inclination toward the fastener-nose.

5. A quarter-turn fastener for fastening first and second layer-like members in face-to-face relation by inserting the nose of the fastener through aligned through-openings in the first and second members and then rotating the fastener a quarter-turn on its axis, said fastener comprising:
a completely preformed barlike fastener-nose extending transversely of the fastener axis and adapted to be positioned against the exposed face of said second member,
> the fastener-nose being composed of sheet metal folded to provide two face-to-face layers of sheet metal connected by a bight at the tip of the fastener-nose,
> the fastener-nose being of small dimension axially of the fastener whereby, when the barlike formation is against the exposed face of said second member, the fastener-nose has a low silhouette on said second member, a completely preformed fastener-shank composed of two layers of sheet metal which are homogeneous with the respective layers of the fastener-nose,
> the fastener-shank having a body which is adapted to be disposed in the through-openings of said second and first members, in loose-fit relationship with such openings, a completely preformed fastener-barrel which embraces the body of the fastener-shank and, when the shank is in said through-openings, compensates at least partially for the loose fit of the shank in said through-openings,
> said barrel being composed of curved sheet-metal portions extending homogeneously from the edges of the shank-body, and a completely preformed fastener-head comprising a springy sheet-metal wings extending in opposite directions from the fastener-shank and adapted to engage the exposed face of said first member,
> the wings being homogeneously connected to the respective shank-layers at flat portions of the shank-layers,
> the wings when unstressed being inclined toward the fastener-nose as each wing is traversed in the direction away from the fastener-shank,
> and the wings being adapted to be flexed in the direction away from the fastener-nose and, in co-operation with the fastener nose, resiliently urge said first and second members toward each other.

6. A quarter-turn fastener for fastening first and second layer-like members in face-to-face relation by inserting the nose of the fastener through aligned through-openings in the first and second members and then rotating the fastener a quarter-turn on its axis, said fastener comprising:
a completely preformed barlike fastener-nose extending transversely of the fastener axis and adapted to be positioned against the exposed face of said second member,
> the fastener-nose being composed of sheet metal folded to provide two face-to-face layers of sheet metal connected by a bight at the tip of the fastener-nose,
> the fastener-nose being of small dimension axially of the fastener whereby, when the barlike formation is against the exposed face of said second member, the fastener-nose has a low silhouette on said second member, a completely preformed fastener-shank composed of two layers of sheet metal which are homogeneous with the respective layers of the fastener-nose,
> the fastener-shank having a body which is adapted to be disposed in the through-openings of said second and first members, in loose-fit relationship with such openings, a completely preformed fastener-barrel which embraces the body of the fastener-shank and, when the shank is in said through-openings, compensates at least partially for the loose fit of the shank in said through-openings, said barrel being composed of curved sheet-metal portions extending homogeneously from the edges of the shank-body, and a completely preformed fastener-head comprising springy sheet-metal wings extending in opposite directions from the fastener-shank and adapted to engage the exposed face of said first member, the fastener-head being of small dimension axially of the fastener whereby, when the wings are engaged with the exposed face of said first member, the fastener-head has a low silhouette on said first member, the wings being homogeneously connected to the respective shank-layers at flat portions of the shank-layers, the wings when unstressed being inclined toward the fastener-nose as each wing is traversed in the direction away from the fastener-shank, and the wings being adapted to be flexed in the direction away from the fastener-nose and, in co-operation with the fastener-nose, resiliently urge said first and second members toward each other.

7. A quarter-turn fastener for fastening first and second layer-like members in face-to-face relation by inserting the nose of the fastener through aligned through-openings in the first and second members and then rotating the fastener a quarter-turn on its axis, said fastener comprising:

a completely preformed barlike fastener-nose extending transversely of the fastener axis and adapted to be positioned against the exposed face of said second member, the fastener-nose being composed of sheet metal folded to provide two face-to-face layers of sheet metal connected by a bight at the tip of the fastener-nose, the fastener-nose being of small dimension axially of the fastener whereby, when the barlike formation is against the exposed face of said second member, the fastener-nose has a low silhouette on said second member, a completely preformed fastener-shank composed of two layers of sheet metal which are homogeneous with the respective layers of the fastener-nose, the fastener-shank having a body which is adapted to be disposed in the through-openings of said second and first members, in loose-fit relationship with such openings, a completely preformed fastener-barrel which embraces the body of the fastener-shank and, when the shank is in said through-openings, compensates at least partially for the loose fit of the shank in said through-openings, said barrel being composed of curved sheet-metal portions extending homogeneously from the edges of the shank-body, and a completely preformed fastener-head comprising springy sheet-metal wings extending in opposite directions from the fastener-shank and adapted to engage the exposed face of said first member, the wings being homogeneously connected to the respective shank-layers at flat portions of the shank-layers, the connection of the wings to the shank-layers being sheet metal extending away from the fastener-nose and then recurved toward the fastening-nose and finally joined homogeneously with said shank-layers, whereby the fastener-head is provided with a protuberance that is suitable for grasping to manipulate the fastener, the wings when unstressed being inclined toward the fastener-nose as each wing is traversed in the direction away from the fastener-shank, and the wings being adapted to be flexed in the direction away from the fastener-nose and, in co-operation with the fastener-nose, resiliently urge said first and second members toward each other.

8. A quarter-turn fastener for fastening first and second layer-like members in face-to-face relation by inserting the nose of the fastener through aligned through-openings in the first and second members and then rotating the fastener a quarter-turn on its axis, said fastener comprising:

a completely preformed barlike fastener-nose extending transversely of the fastener axis and adapted to be positioned against the exposed face of said second member, the fastener-nose being composed of sheet metal folded to provide two face-to-face layers of sheet metal connected by a bight at the tip of the fastener-nose, the fastener-nose being of small dimension axially of the fastener whereby, when the barlike formation is against the exposed face of said second member, the fastener-nose has a low silhouette on said second member, a completely preformed fastener-shank composed of two layers of sheet metal which are homogeneous with the respective layers of the fastener-nose, the fastener-shank having a body which is adapted to be disposed in the through-openings of said second and first members, in loose-fit relationship with such openings, a completely preformed fastener-barrel which embraces the body of the fastener-shank and, when the shank is in said through-openings, compensates at least partially for the loose fit of the shank in said through-openings, said barrel being composed of curved sheet-metal portions extending homogeneously from the edges of the shank-body, and a completely preformed fastener-head comprising springly sheet-metal wings extending in opposite directions from the fastener-shank and adapted to engage the exposed face of said first member, the wings being homogeneously connected to the respective shank-layers at flat portions of the shank-layers, the wings when unstressed being inclined toward the fastener-nose as each wing is traversed in the direction away from the fastener-shank, the wings being adapted to be flexed in the direction away from the fastener-nose and, in co-operation with the fastener-nose, resiliently urge said first and second members toward each other, and the fastener-head including finger tabs at the ends of the wings for manually flexing the wings to reduce their inclination toward the fastener-nose.

9. A sheet-metal quarter-turn fastener comprising: sheet metal folded into a bight at the nose of the fastener, the nose having means extending laterally of the fastener axis for engagement behind a member through which the fastener is inserted and then turned; generally parallel shank members extending from the nose in the general direction of the fastener axis, the nose-remote portions of the shank members being flat and being in face-to-face relation; a head integral with the nose-remote portions of the shank members, the head having wings extending laterally of the fastener axis for engagement against a member through which the fastener is inserted; and means extending from the shank members and providing the fastener with an enlarged portion located between the nose and the wings, such means being a plurality of curved tabs that, taken collectively, provide the fastener with a barrellike formation coaxial with the fastener axis.

10. A sheet-metal quarter-turn fastener comprising: sheet metal folded into a bight at the nose of the fastener, the nose having means extending laterally of the fastener axis for engagement behind a member through which the fastener is inserted and then turned; generally parallel shank members extending from the nose in the general direction of the fastener axis, the nose-remote portions of the shank members being flat and being in face-to-face relation; a head integral with the nose-remote portions of the shank members, the head having wings extending laterally of the fastener axis for engagement against a member through which the fastener is inserted, the wings in the unapplied fastener being inclined toward the nose of the fastener and being adapted to make a springy engagement against a member through which the fastener is inserted; and means extending from the shank members and providing the fastener with an enlarged portion located between the nose and the wings.

11. A quarter-turn fastener as in claim 10 in which, at the ends of the wings, there are finger tabs for manually flexing the wings to reduce their inclination toward the nose of the fastener while the fastener is being inserted through a member.

12. A sheet-metal quarter-turn fastener comprising: sheet metal folded into a bight at the nose of the fastener, the nose having means extending laterally of the fastener axis for engagement behind a member through which the fastener is inserted and then turned; generally parallel shank members extending from the nose in the general direction of the fastener axis, the nose-remote portions of the shank members being flat and being in face-to-face relation; a head integral with the nose-remote portions of the shank members, the head having wings extending laterally of the fastener axis for engagement against a member through which the fastener is inserted; and means extending from the shank members and providing the fastener with an enlarged portion located between the nose and the wings; and the fastener being further characterized by, at the nose-remote end of the shank members, there being means for telescopically receiving a tool to apply turning movement to the fastener and separate means to be engaged by the end of the tool to transmit axial pressure toward the nose of the fastener.

13. A sheet-metal quarter-turn fastener comprising: sheet metal folded into a bight at the nose of the fastener, the nose having means extending laterally of the fastener axis for engagement behind a member through which the fastener is inserted and then turned; generally parallel shank members extending from the nose in the general direction of the fastener axis, the nose-remote portions of the shank members being flat and being in face-to-face relation; a head integral with the nose-remote portions of the shank members, the head having wings extending laterally of the fastener axis for engagement against a member through which the fastener is inserted; and means extending from the shank members and providing the fastener with an enlarged portion located between the nose and the wings; and the fastener being further characterized by the metal of the shank members extending beyond the wings and the metal of the head being looped back to the wings thereby providing a protuberance adapted to be grasped with the fingers or with pliers for facilitating the application of the fastener.

References Cited in the file of this patent

UNITED STATES PATENTS

| | | |
|---|---|---|
| 1,723,971 | Johnson | Aug. 6, 1929 |
| 1,772,255 | Kondolf | Aug. 5, 1930 |
| 1,873,880 | Hall et al. | Aug. 23, 1932 |
| 2,035,429 | Hall | Mar. 24, 1936 |
| 2,162,652 | Tinnerman | June 13, 1939 |
| 2,200,702 | Oddie | May 14, 1940 |
| 2,238,854 | Wagstaff | Apr. 15, 1941 |
| 2,256,331 | Watter | Sept. 16, 1941 |
| 2,430,809 | Flora et al. | Nov. 11, 1947 |
| 2,728,259 | Poupitch | Dec. 27, 1955 |

FOREIGN PATENTS

| | | |
|---|---|---|
| 595,596 | France | July 20, 1925 |

UNITED STATES PATENT OFFICE

CERTIFICATE OF CORRECTION

Patent No. 3,121,273

February 18, 1964

William B. Duffy et al.

It is hereby certified that error appears in the above numbered patent requiring correction and that the said Letters Patent should read as corrected below.

Column 4, line 54, for "materal" read -- material --; column 6, line 3, for "fastened" read -- fastener --; line 55, for "a" read -- at --; column 7, line 18, for "lies" read -- lie --; line 25, for "damagest" read -- damages --; same column 7, line 40, for "X—Y" read -- X—X --; column 8, line 3, for "to" read -- in --; column 10, line 35, for "member." read -- member, --; column 12, line 32, strike out "a"; column 14, line 43, for "springly" read -- springy --.

Signed and sealed this 15th day of September 1964.

(SEAL)
Attest:

ERNEST W. SWIDER
Attesting Officer

EDWARD J. BRENNER
Commissioner of Patents